US008116604B2

(12) United States Patent  
Bonicel et al.

(10) Patent No.: US 8,116,604 B2  
(45) Date of Patent: Feb. 14, 2012

(54) TELECOMMUNICATION OPTICAL FIBER CABLE

(75) Inventors: Jean-Pierre Bonicel, Rueil Malmaison (FR); Olivier Tatat, Sangatte (FR)

(73) Assignee: Draka Comteq, B.V., Amsterdam (NL)

( * ) Notice: Subject to any disclaimer, the term of this patent is extended or adjusted under 35 U.S.C. 154(b) by 1130 days.

(21) Appl. No.: 11/938,280

(22) Filed: Nov. 10, 2007

(65) Prior Publication Data

US 2010/0266249 A1    Oct. 21, 2010

(30) Foreign Application Priority Data

Nov. 10, 2006  (FR) ...................................... 06 09834

(51) Int. Cl.  
*G02B 6/44* (2006.01)
(52) U.S. Cl. ........................................ 385/110; 385/112
(58) Field of Classification Search ........................ None  
See application file for complete search history.

(56) References Cited

U.S. PATENT DOCUMENTS

| 4,401,366 | A | * | 8/1983 | Hope ............................. 385/110 |
| 4,836,639 | A |   | 6/1989 | Shamoto et al. |
| 5,109,457 | A | * | 4/1992 | Panuska et al. ................ 385/102 |
| 5,155,789 | A |   | 10/1992 | Le Noane et al. |
| 5,289,556 | A | * | 2/1994 | Rawlyk et al. ................. 385/112 |
| 5,649,043 | A | * | 7/1997 | Adams et al. .................. 385/110 |
| 5,671,312 | A |   | 9/1997 | Jamet |
| 6,101,305 | A | * | 8/2000 | Wagman et al. ............... 385/113 |
| 6,181,857 | B1 |   | 1/2001 | Emeterio et al. |
| 6,366,725 | B1 |   | 4/2002 | Weiss et al. |
| 6,374,023 | B1 | * | 4/2002 | Parris ............................. 385/109 |
| 6,718,101 | B2 |   | 4/2004 | Le Noane et al. |
| 6,788,858 | B1 | * | 9/2004 | Park et al. ...................... 385/109 |
| 6,937,802 | B2 |   | 8/2005 | Jamet et al. |
| 2001/0007604 | A1 | * | 7/2001 | Lail ............................... 385/114 |
| 2002/0154873 | A1 | * | 10/2002 | Sheu ............................. 385/114 |
| 2006/0147164 | A1 |   | 7/2006 | Bau et al. |
| 2006/0193573 | A1 | * | 8/2006 | Greenwood et al. .......... 385/103 |
| 2010/0254668 | A1 | * | 10/2010 | Consonni et al. ............. 385/102 |

FOREIGN PATENT DOCUMENTS

| EP | 1921478 A1 | 5/2008 |
| FR | 2214900 A | 8/1974 |
| GB | 1423590 A | 2/1975 |
| JP | 7-146426 A | * 6/1995 |
| JP | 2000-131572 A | * 5/2000 |

OTHER PUBLICATIONS

European Search Report in corresponding European Application No. 07021404, dated Mar. 10, 2008.  
French Search Report and Written Opinion in corresponding French Application No. 0609834, dated Jun. 6, 2007.

* cited by examiner

*Primary Examiner* — Mike Stahl  
(74) *Attorney, Agent, or Firm* — Summa, Additon & Ashe, P.A.

(57) ABSTRACT

A telecommunication optical fiber cable possesses a longitudinal central cavity that receives micromodules of optical fibers positioned in parallel. A jacket surrounds the central cavity and a sheath is positioned on the inner periphery of the jacket. A lubricant is provided in the central cavity.

The cable, which may contain more than 100 optical fibers, is suitable for an outdoor installation and enables a micromodule to be extracted over substantial lengths.

21 Claims, 2 Drawing Sheets

TELECOMMUNICATION OPTICAL FIBER CABLE

CROSS-REFERENCE TO PRIORITY APPLICATION

This application claims the benefit of pending French Application No. 06/09834 (filed Nov. 10, 2006, at the French Patent Office), which is hereby incorporated by reference in its entirety.

FIELD OF THE INVENTION

The present invention relates to optical fiber telecommunication cables and, more particularly, to so called micromodule cables in which optical fibers are grouped to form a plurality of micromodules gathered together as a cable.

BACKGROUND OF THE INVENTION

Optical fiber cables that include several optical fiber micromodules are known. For example, French Publication No. FR 2,665,266 A (and its counterpart U.S. Pat. No. 5,155,789) and French Publication No. FR 2,706,218 A (and its counterpart U.S. Pat. No. 5,671,312) disclose an optical fiber micromodule surrounded by a retaining jacket enclosing several fibers.

A micromodule telecommunication cable includes a plurality of optical fibers grouped in micromodules. A micromodule may contain about 2 to 24 fibers enclosed in a flexible retaining jacket. The jackets for retaining the micromodules and the jackets of optical fibers may be colored to facilitate location of the fibers in the cable, (e.g., during connection operations).

The micromodules are disposed in a central cavity of the cable such that the cable jacket surrounds the micromodules. The jacket of the cable may be polymeric, typically of polyethylene; it may be extruded during the formation of the cable as the fibers are gradually grouped into micromodules.

The cable jacket may also contain reinforcing members positioned longitudinally. Indeed, the jacket typically is formed of material that is moisture-resistant but sensitive to temperature changes and not mechanically rigid. The reinforcing members are thus used for limiting the deformations of the cable due to tensile forces, such as occur during the installation of the cable in a duct, and for limiting the axial deformations of the cable upon compression and expansion when the cable is subject to significant changes in temperature, (i.e., by compensating the compression or expansion forces induced by the jacket).

Telecommunication optical fiber cables are generally intended to be laid in ducts of metropolitan or long-distance transmission systems. To permit the cable to be laid in a duct, the cable should have robustness to withstand the traction and the mechanical stresses of the laying, and flexibility along at least one folding direction to allow it to be inserted into the ducts of the system. Further, a telecommunication cable should generally withstand conditions of use over a large temperature range (e.g., −40° C. to +60° C.), which may cause expansions and compressions in the cable jacket. With the reinforcing members of the cable, the mechanical stresses experienced by the cable during the laying in a duct may be absorbed and the optical fibers positioned in the cable may thereby be protected. Such reinforcing members may be located in the central area of the cable or at its periphery thereof.

With development of telecommunications optical fiber systems to the subscriber, commonly known as Fiber-to-the-Home (FTTH) or Fiber-to-the-Curb (FTTC), it is desirable to produce cables with sufficient capacity to contain numerous optical fibers. Such cables are intended to be installed in an aggressive urban environment, (e.g., sewers), where they should be capable of resisting rodents and corrosion. Moreover, such cables should also provide individual access to each micromodule for distribution in a given building. In particular, each micromodule picked up during a bypass operation should be able to be drawn over several tens of meters in order to reach an optical box for junction with a telecommunication system of a given building.

European Publication No. EP 1,052,533 A (and its counterpart U.S. Pat. No. 6,181,857) describe a method for accessing one or more optical fibers in a sheath disposed in a telecommunications cable. Two cut-outs are made in the sheath to create a first aperture through which a fiber is cut and a second aperture through which the cut fiber is drawn in order to be bypassed. This publication discloses an optical fiber cable having a jacket forming a cavity that contains a telecommunications core. The core is formed by a plurality of colored optical fiber buffer tubes or sheaths. This publication, however, fails to disclose the presence of any lubricant in the cavity.

French Publication No. 2,214,900 discloses a telecommunications cable that includes a central cavity enclosing several bundles of optical fibers. The core of the cable is surrounded by a protective jacket, a metal layer, and an external jacket. The optical fibers are in a stranded configuration.

European Publication No. EP 0,468,878 (and its counterpart U.S. Pat. No. 5,155,789) disclose a telecommunications cable that includes high-density groups of parallel optical fibers within a cavity. This publication fails to disclose the presence of any lubricant within the cable cavity.

U.S. Patent Publication No. 2006/147164 discloses a telecommunications cable that includes bundles of optical fibers arranged within an inner polyolefin tube. This publication explicitly teaches that optical fibers and microbundles should be SZ stranded.

U.S. Pat. No. 6,366,725 discloses a telecommunications cable that includes bundles of optical fibers, wherein the core is surrounded by an outer cladding made of stainless steel. The outer cladding is not located on the inner periphery of said jacket. This patent fails to disclose the presence of any lubricant within the cavity.

International Publication No. WO 2001/98810 A (and its counterpart U.S. Pat. No. 6,718,101) describe a continuously accessible optical fiber that is particularly suited for local subscriber loops and interior cablings. This cable includes a protective jacket surrounding an oval cavity that receives optical fiber micromodules. The disclosed cable may receive only about 12 to 96 optical fibers.

According to International Publication No. WO 2001/98810, its fibers are arranged in the cable so that they occupy the major portion of the cavity along the major axis but leave significant clearance in the minor axis of the cavity. This clearance allows changes in overlength of the fibers in the cable. The jacket includes reinforcing members positioned on either side of the cavity along the major axis. The cable is wound on a cable drum or bent during installation in a duct along the major axis, thereby benefiting from the large clearance in the minor axis. The optical fibers thus have a certain degree of freedom within the cavity of the cable, lessening stresses upon jacket lengthening, such as from tension or from thermal expansion or contraction. The jacket includes markings (i.e., colored thin lines, fracture initiations, or areas with thinner thickness) to indicate the areas where windows may be pierced for bypass operations. A first access window may thus be opened in order to section a given micromodule and a second access window is opened for extracting the micromodule selected for the bypass. This publication fails to disclose (i) any lubricant in the central cavity and (ii) a sheath on the inner periphery of the jacket.

Moreover, International Publication No. WO 2001/98810 discloses a cable that provides a bypass of a micromodule extracted from the cable over a few tens of centimeters to several meters, but it does not provide a bypass over several tens of meters. Further, the disclosed cable is not suitable for installation in an aggressive environment such as sewers. The disclosed elastomer cable jacket is not sufficient for ensuring the integrity of the optical fibers in an aggressive outdoor environment.

European Publication No. EP 0,240,165 A (and its counterpart U.S. Pat. No. 4,836,639) disclose a cable in which the optical fibers are positioned in parallel (i.e., not wound as helices or non-cabled). The optical fibers are then positioned in contact with the inner wall of the jacket. This publication proposes that the reinforcing members of the jacket be positioned in proximity to the fibers. The reinforcing members are thus located on the side interior to the curvature of the cable when the cable is wound or bent. A neutral axis or a zero stress line connects the reinforcing members and passes through the group of fibers. Thus, the fibers do not retract or lengthen when the cable is wound or unwound from a cable drum. Such an arrangement may only be applied in a cable that includes only a rather limited number of optical fibers. Moreover, this publication fails to disclose any lubricant in the central cavity.

French Publication No. FR 2,815,141 (and its counterpart U.S. Pat. No. 6,937,802) disclose a telecommunications cable in which super modules of optical fibers are located in a central cavity. This publication fails to disclose the presence of any lubricant in the central cavity and any sheath located on the inner periphery of the jacket.

There is a need, therefore, for an outdoor cable that has a large capacity (i.e., several hundred optical fibers), and that provides a bypass of one or several micromodules over several tens of meters.

SUMMARY OF THE INVENTION

Accordingly, in one aspect the invention embraces an optical fiber cable including a protective sheath and containing several hundred optical fibers grouped in micromodules positioned in parallel. A lubricant is included within the interior space of the optical fiber cable.

The sheath (e.g., steel) protects the cable in an aggressive environments (e.g., sewers). With the parallel arrangement of the micromodules—without any helical winding or other internal cabling—and the presence of lubricant, one or more micromodules may be extracted from a large number of micromodules over a substantial length. Such a cable, therefore, is particularly suited to outdoor installation for distributing numerous optical fibers.

As noted, in one aspect the invention particularly embraces a telecommunication optical fiber cable that includes (i) a longitudinal central cavity containing a lubricant and receiving micromodules of optical fibers disposed in parallel; (ii) a jacket surrounding the central cavity; and (iii) a sheath located on the inner periphery of the jacket.

According to the exemplary embodiments of the present invention, the optical fiber cable may further include one or more of the following features:

the lubricant is a dry lubricant;
the sheath is an overlapping steel tape that may be corrugated;
the cable further includes reinforcing members disposed in the jacket in a plane that is off-center from a median transverse cable plane;
the cable further includes at least one marking on the periphery of the cable to indicate an opening window (i.e., an opening window), the marking being located on the side opposite the reinforcing members with respect to the median transverse cable plane;
the cable further includes a protective envelope positioned against the inner periphery of the sheath;
the protective envelope is formed from polyester;
the cable includes more than 100 optical fibers;
the micromodules occupy between about 30 percent and 70 percent of the cable's central cavity (i.e., a micromodule filling coefficient of 0.3 to 0.7).

In another aspect, the invention embraces a method for extracting at least one micromodule from a cable according to the invention. In this regard, the method includes he following steps: (i) making a first opening in the cable in order to section at least one micromodule; (ii) making a second opening in the cable in order to extract one or more sectioned micromodules, the second opening being at least five meters from the first opening.

The foregoing, as well as other characteristics and advantages of the present invention, and the manner in which the same are accomplished, are further specified within the following detailed description and its accompanying drawings.

DETAILED DESCRIPTION

The present invention is described herein with reference to the accompanying drawings. As will be appreciated by those having ordinary skill in the art, these drawings are schematic representations, which are not necessarily drawn to scale. This invention may be embodied in many different forms and should not be construed as limited to the embodiments set forth herein. The embodiments disclosed are provided to convey the scope of the invention to those having skill in the relevant art.

Figure 1:
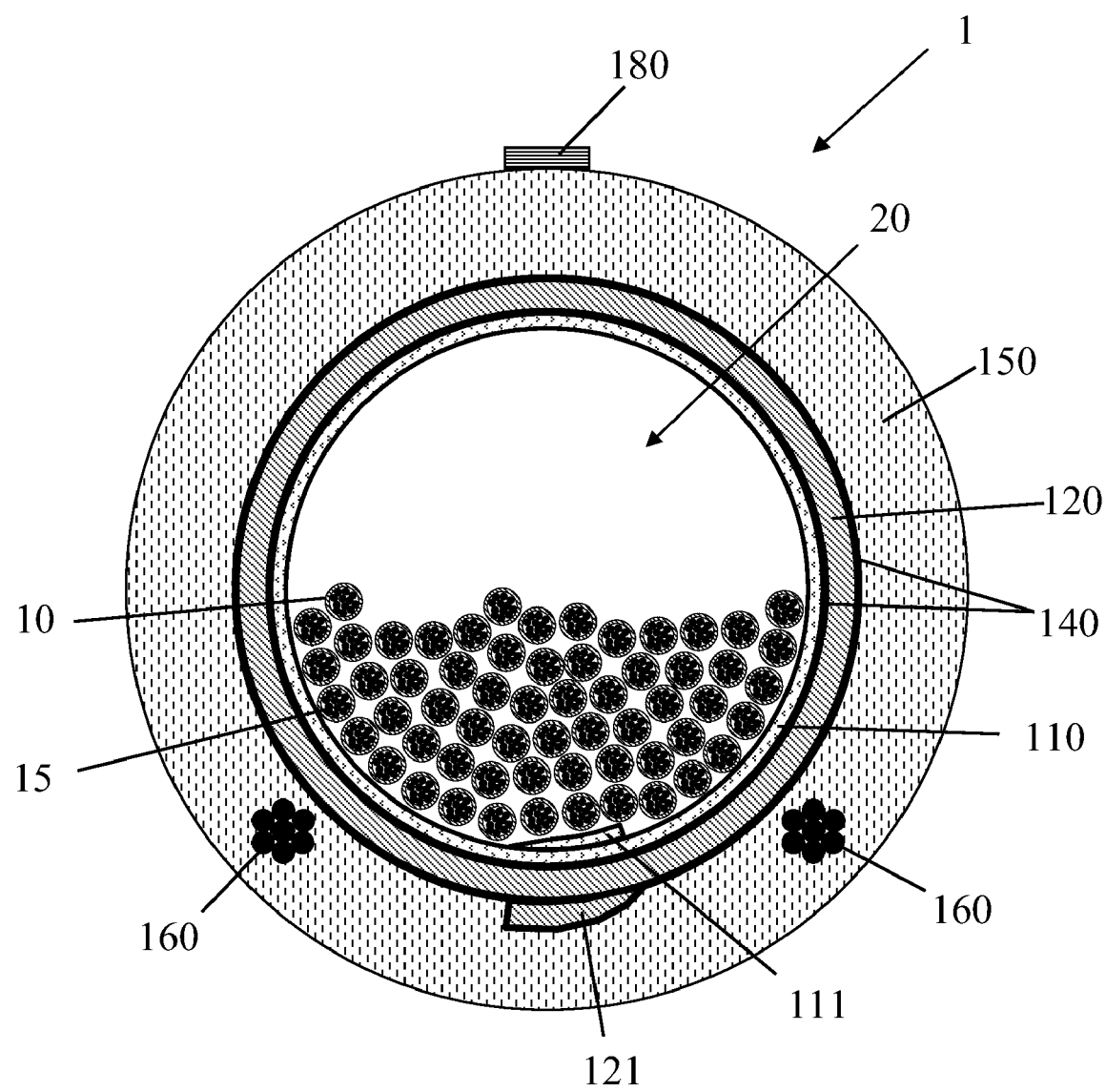
FIG. 1 schematically depicts a transverse sectional view of an exemplary embodiment of the cable according to the present invention.

FIG. 1 depicts an exemplary cable 1 according to one aspect of the present invention. Cable 1 defines a longitudinal central cavity 20 that receives the core of the cable, namely a plurality of micromodules 10 that are positioned substantially parallel to each other. The micromodules 10 contain optical fibers 15, which are likewise positioned substantially parallel to each other (e.g., not twisted) within a micromodule 10. As used herein, the phrase "parallel optical fibers" and the like refers to non-cabled optical fibers (i.e., optical fibers that are not wound as helices or alternating-SZ stranded).

A jacket 150 surrounds the central cavity 20 (and thus the micromodules 10 and optical fibers 15, too). The jacket 150 is typically polymeric (e.g., formed of high-density polyethylene or HDPE). The jacket 150 possesses good moisture barrier and satisfactory mechanical flexibility.

In practice, the jacket 150 is typically extruded to thereby form cavity 20 in which the micromodules 10 are longitudinally positioned. With reference to the transverse section of the cable 1 as depicted in FIG. 1, the jacket 150 has an inner periphery and an outer periphery (i.e., defined radially). The outer circumference of jacket 150 is typically cylindrical, and thus the central cavity 20 is likewise a substantially cylindrical space. The jacket 150 typically maintains a constant thickness over the length of the cable 1.

FIG. 1 further illustrates a sheath 120 placed on the inner periphery of the jacket 150 (e.g., the sheath 120 is adjacent to the jacket 150). By way of example, this sheath 120 may be corrugated stainless steel tape that is positioned longitudinally with overlapping. An overlapped portion 121 of the stainless steel tape is depicted in FIG. 1. The cable 1 is suitable for use outdoors and other harsh environments, such as sewers, and so the sheath 120 helps to protect against corrosion and rodents. Suitable stainless steels to ensure satisfactory protection against corrosion are grade 304 and grade 316. The steel tape may be corrugated in order to provide some flexibility during cable installation and placement.

The exemplary cable 1 depicted in FIG. 1 possesses 720 optical fibers. More specifically, the cable 1 includes sixty micromodules 10, each of which includes twelve optical fibers 15. Even so, the 720 optical fibers only partially fill the central cavity 20.

More generally, the cable 1 according to the present invention will typically include a large number of fibers (e.g., at least 100 and perhaps several hundred.) By way of example, the cable 1 according to the present invention may include between about 400 and 1,600 optical fibers 15 that are distributed in micromodules 10, each having between about eight and 24 optical fibers 15 (e.g., 16 or more optical fibers in at least one micromodule 10). Such cable structures yield a cable diameter of between about 20 millimeters and 35 millimeters. By way of further example, a typical cable 1 having between about 600 and 1,000 optical fibers 15 typically has an outer diameter of about 25 millimeters.

Because there are so many micromodules 10 and optical fibers 15 positioned within the cable 1, extraction of a micromodule 10 through an opening window requires (i) reduced friction between micromodules 10 (i.e., friction minimization) and (ii) sufficient clearance between the micromodules 10. An overlength of the micromodules 10 (and thus of the optical fibers 15) should also be provided inside the central cavity 20 of the cable 1. This overlength not only facilitates micromodule selection during a bypass operation, but also promotes good weathering and mechanical behavior of the cable 1.

In conventional cables, to reduce (if not minimize) friction, a jacket for retaining micromodules might be selected to reduce friction between the micromodules and jacket.

In practicing the present invention, however, friction between the micromodules 10 is inevitable because more optical fibers 15 (e.g., at least 100 and even more than 600) are positioned within the cable 1 (i.e., as compared with prior art cables). To the extent such larger numbers of optical fibers 15 (and micromodules 10) are present in the cable 1, the jacket 150 and micromodules 10 can be selected to provide better flexibility to the core. The micromodules 10, for example, can be formed from elastomers or other flexible polymeric compositions.

To solve the friction problem between the micromodules 10 and to facilitate the extraction of a micromodule 10 from dozens of them over more than five meters (e.g., between about 15 and 30 meters), the present invention adds a lubricant into the core of the cable 1. Typically, the lubricant is a dry, non-greasy lubricant, such as talc, to avoid having to clean the extracted micromodules 10.

According to the present invention, a maximum filling coefficient of the central cavity 20 is defined to ensure sufficient clearance between the micromodules 10. This micromodule filling coefficient is defined as the ratio between the sum of the transverse sections of all the micromodules 10 (i.e., the cumulative cross-sectional area of the micromodules 10) and the inner, transverse section of the cavity 20 (i.e., the cross-sectional area of the central cavity 20), such as defined by the inner wall of the steel sheath 120. This coefficient will be of varying significance depending on the length of the micromodules 10 to be extracted. Typically the micromodule filling coefficient will be less than about 0.7 (e.g., 0.3 to 0.5), typically less than 0.5 (e.g., 0.2 to 0.4, such as 0.30 to 0.35).

FIG. 1 further illustrates a protective envelope 110 of the core, which forms a protective contact interface between the micromodules 10 and the sheath 120. This protective envelope 110 may consist of a plastic tape (e.g., polyester tape) having a thickness from 30 to 50 microns. This protective envelope 110 further protects the micromodules 10 against the mechanical tool that is used to cut the jacket 150 and the sheath 120 as is necessary during a bypass operation to create an opening window. Furthermore, the protective envelope 110 prevents direct mechanical contact between the micromodules 10 and the corrugated stainless steel of the sheath 120 (or its overlapping edge 121). Such contact can damage the micromodules 10.

This protective envelope 110 is pressed against the inner wall of the steel sheath 120 (i.e., it is not restrictively wrapped around the micromodules 10) and does not slow down the extraction of the micromodules 10 through an opening window. The steel tape forming the sheath 120 may be laminated with a copolymer 140 (e.g., a polymeric film or sheet) to provide an adherent bond with the protective envelope 110 and the jacket 150. With the protective envelope 110, the lubricant introduced (e.g., distributed) into the cavity 20 of the cable may further be retained therein.

The cable depicted in FIG. 1 further includes two reinforcing members 160 that are positioned longitudinally within the jacket 150. These reinforcing members 160 may be rods of glass-reinforced plastic (i.e., GRP), stranded or single-strand galvanized steel rods, aramide-reinforced plastic rods, any other suitable longitudinal reinforcing member for stiffening a telecommunication cable.

According to the present invention, these reinforcing members 160 are typically off-centered with a median transverse plane of the cable. This arrangement of the reinforcing members 160 makes it possible to define a preferential folding plane of the cable 1 (i.e., a preferential cable bending plane). In this way, the cable 1 may be readily inserted into the ducts of the telecommunication system for which it is intended.

Figure 2:
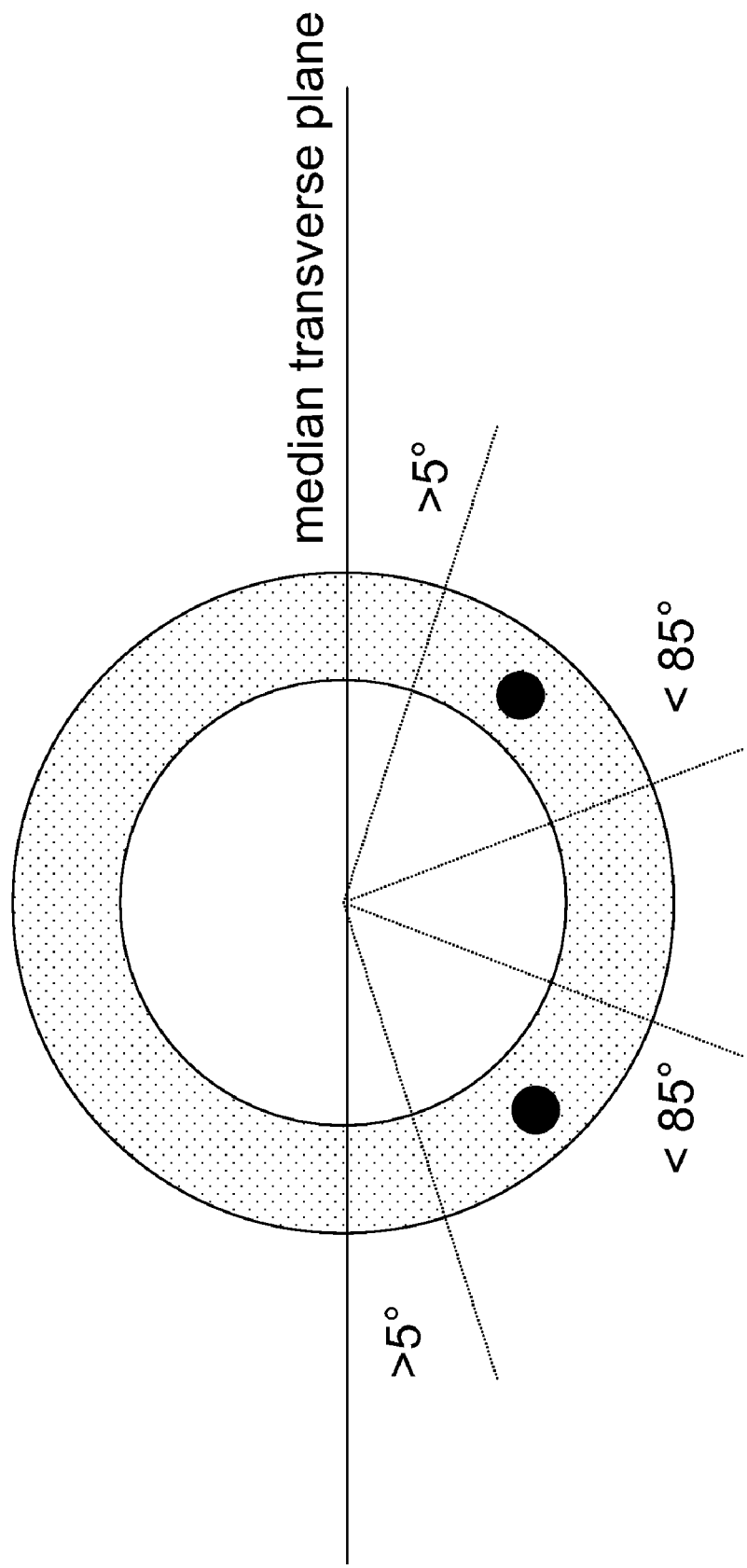
FIG. 2 schematically depicts the positioning of reinforcing members in an exemplary cable according to the present invention.

To the extent that the reinforcing members 160 are positioned off-center (i.e., biased toward one side of the jacket 150), they define a folding axis, shifted relative to a diameter of the cable, while clearing a larger space on the opposite side of the cable in order to provide access to the micromodules 10. Thus, when an opening window is cut in the cable 1 on the side opposite the reinforcing members 160, the reinforcing members 160 are not touched. In this way, the mechanical integrity of the cable 1 is retained even after cutting one or more access windows. In a typical embodiment each reinforcing member 160 is positioned off-center toward the same side of the jacket 150, in an respective region that is between 5° and 85° as viewed from the median transverse plane (e.g., offset from the median transverse plane between about 30° and 60°, such as about 45°). This is schematically depicted in FIG. 2.

FIG. 1 shows opening indicator markings 180 located on the periphery of the cable 1. These markings indicate the areas in which opening windows may be cut out. Such windows, which are discrete portions of the cable, prevent the cable 1 from opening over its entire length.

FIG. 1 also shows that the protective envelope 110 and the sheath 120 each have respective overlapping areas 111, 121. The protective envelope 110 and the sheath 120, both of which can be in the form of tapes, can be laid longitudinally with an overlap. If a mechanized cutting tool has to be used, the overlapping 121 of the tape of the sheath 120 will preferably be located away from the area in which an opening window may be removed in order to avoid having to cut two thicknesses of steel. If the reinforcing members 160 are off-centered with respect to a transverse axis of the cable (as explained previously) the overlapping area 121 of the steel tape of the sheath 120 will be located in the half of the cable 1 that also contains the reinforcing members 160, typically between both reinforcing members 160 as depicted in FIG. 1. Such a configuration provides easier access to the micromodules 10 (and their optical fibers 15) through an opening window at the marking 180, as the cutting of the jacket 150, the sheath 120, and the envelope 110 is performed away from the overlapping areas 111, 121 and without interfering with the reinforcing members 160.

If the aperture of the opening windows is made manually by accessing the overlap of the steel tape 120, the tape overlap 121 of the sheath 120 would typically be located just under the marking area 180. The overlapping area 121 will be located, of course, on the side opposite the reinforcing members 160, which preferably remain away from the access windows apertures. The overlapping areas 111, 121 may be located in the same place of the cable (i.e., having the same cylindrical coordinates when the cable is considered in a transverse section). Those having ordinary skill in the art will appreciate that the position of the overlap 111 of the protective envelope 110 is not critical as it is easy to cut.

The micromodule overlength introduced into the cable 1 during manufacturing, the off-centering of the plane of the reinforcing members 160 with the diameter plane, and the low filling rate of the cavity are chosen to ensure that the micromodules 10 are not subject to tensile stresses (or, alternatively, become excessive in overlength when the cable is wound).

Such a configuration provides a large degree of freedom of the micromodules 10 relatively to each other and provides possible extraction of one or more micromodules 10 over a relatively large distance (e.g., larger than 5 meters and even larger than ten meters). Those having ordinary skill in the art will understand that a micromodule 10 contained in the cable 1 according to the invention may be extracted over a distance of less than 5 meters, depending on the location of the junction boxes to be connected. Nevertheless, the cable 1 according to the present invention facilitates the extraction of a micromodule 10 from tens of micromodules 10 over several tens of meters (e.g., a length of 25 meters or more).

In the specification and figures, typical embodiments of the invention have been disclosed. The present invention is not limited to such exemplary embodiments. Unless otherwise noted, specific terms have been used in a generic and descriptive sense and not for purposes of limitation.

The invention claimed is:

1. A telecommunication optical fiber cable, comprising:
a longitudinal central cavity (20) containing a lubricant and receiving micromodules (10) of optical fibers (15) positioned in parallel;
a jacket (150) surrounding the central cavity (20);
a sheath (120) located on the inner periphery of the jacket (150), said sheath (120) comprising overlapping steel tape (121); and
reinforcing members (160) positioned in the jacket (150) in a plane off-centered with a median transverse plane of the cable, wherein each reinforcing member (160) is positioned off-center toward the same side of the jacket (150) as viewed from the median transverse plane.

2. The cable of claim 1, wherein the lubricant is a dry lubricant.

3. The cable of claim 1, wherein the steel tape (120) is corrugated.

4. The cable of claim 1, further comprising at least one opening indicator marking (180) on the periphery of the cable, the marking being situated opposite the reinforcing members (160) with respect to the median transverse plane of the cable.

5. The cable of claim 1, comprising more than 100 optical fibers positioned within the micromodules (10).

6. The cable of claim 1, wherein the micromodules (10) occupy between about 30 percent and 70 percent of the central cavity (20).

7. A method for extracting at least one micromodule in a cable according claim 1, the method comprising the steps of:
making a first opening in the cable in order to section at least one micromodule; and
making a second opening in the cable in order to extract said at least one sectioned micromodule;
wherein the second opening being distant from the first opening by at least 5 meters.

8. A telecommunication optical fiber cable, comprising:
a longitudinal central cavity (20) containing a lubricant and receiving micromodules (10) of optical fibers (15) positioned in parallel;
a jacket (150) surrounding the central cavity (20);
a sheath (120) located on the inner periphery of the jacket (150);
a protective envelope (110) pressed against the inner periphery of the sheath (120); and
reinforcing members (160) positioned in the jacket (150) in a plane off-centered with a median transverse plane of the cable, wherein each reinforcing member (160) is positioned off-center toward the same side of the jacket (150) as viewed from the median transverse plane.

9. The cable of claim 8, wherein the protective envelope (110) comprises polyester.

10. The cable of claim 8, wherein the micromodule filling coefficient within the central cavity is between about 0.3 and 0.7.

11. The cable of claim 8, wherein each said reinforcing member is offset from the median transverse plane by about 5° to 85°.

12. The cable of claim 8, wherein each said reinforcing member is offset from the median transverse plane by about 30° to 60°.

13. The cable of claim 8, wherein the micromodule filling coefficient within the central cavity is less than about 0.5.

14. The cable of claim 8, wherein the total number of said optical fibers positioned within said micromodules is between about 400 and 1,600.

15. The cable of claim 8, wherein at least eight said optical fibers are positioned within each said micromodule.

16. A telecommunication optical fiber cable, comprising:
a longitudinal central cavity (20) containing a lubricant and receiving micromodules (10) of optical fibers (15) positioned in parallel;
a jacket (150) surrounding the central cavity (20);
a sheath (120) located on the inner periphery of the jacket (150), said sheath (120) comprising overlapping steel tape (121);

a protective envelope (110) pressed against the inner periphery of the sheath (120); and reinforcing members (160) positioned in the jacket (150) in a plane off-centered with a median transverse plane of the cable, wherein each reinforcing member (160) is positioned off-center toward the same side of the jacket (150) as viewed from the median transverse plane.

17. The cable of claim 16, wherein the lubricant is a dry, non-greasy lubricant present in an amount sufficient to reduce friction between said micromodules so as to facilitate extraction of one or more micromodules over a distance of at least about ten meters.

18. The cable of claim 16, wherein the micromodule filling coefficient within the central cavity is less than 0.7.

19. The cable of claim 16, wherein each said reinforcing member is offset from the median transverse plane by at least about 5° toward the same side of said cable jacket with respect to the median transverse plane to define a preferential cable bending plane.

20. The cable of claim 16, wherein:
said micromodules are non-cabled micromodules;
the micromodule filling coefficient within the longitudinal central cavity is between about 0.3 and 0.7; and
the total number of said optical fibers positioned within said micromodules is at least about 400.

21. The cable of claim 16, wherein:
each said reinforcing member is offset from the median transverse plane by about 5° to 85°;
the micromodule filling coefficient within the central cavity is less than 0.7; and
at least eight said optical fibers are positioned within each said micromodule.

* * * * *